United States Patent [19]

Iwase

[11] 4,181,848
[45] Jan. 1, 1980

[54] ELECTRONIC DIGITAL SCALE WITH A MEMORY

[75] Inventor: Tetsuo Iwase, Yamatokoriyama, Japan

[73] Assignee: Sharp Kabushiki Kaisha, Osaka, Japan

[21] Appl. No.: 845,653

[22] Filed: Oct. 26, 1977

[30] Foreign Application Priority Data

Oct. 26, 1976 [JP] Japan .................. 51-144576[U]

[51] Int. Cl.² .............................................. G06M 3/14
[52] U.S. Cl. .......................... 235/92 DN; 235/92 CP; 235/92 R; 33/140; 364/562
[58] Field of Search ........ 235/92 DN, 92 CP, 92 DP, 235/92 SA; 364/561, 562; 33/140, 137 R

[56] References Cited

U.S. PATENT DOCUMENTS

| 3,654,449 | 3/1972 | Boyce | 235/92 DN |
| 3,683,159 | 8/1972 | Welch et al. | 235/92 DN |
| 3,777,126 | 12/1973 | Hoff | 235/92 CP |
| 4,031,360 | 6/1977 | Soule | 235/92 DN |

*Primary Examiner*—Joseph M. Thesz
*Attorney, Agent, or Firm*—Birch, Stewart, Kolasch and Birch

[57] ABSTRACT

An electronic digital read-out scale having an extensible tape member is disclosed having a memory designed to store first measurement information for calculation with the subsequent measurement information. A memory key is included within the scale functions to transfer information to the memory. A plus key and a minus key are further provided within the electronic digital scale for addition or subtraction purposes, respectively. Final measurement results are derived through calculations of the measurement information stored in the memory with the subsequent measurement information.

12 Claims, 4 Drawing Figures

ELECTRONIC DIGITAL SCALE WITH A MEMORY

BACKGROUND OF THE INVENTION

The present invention relates to an electronic digital scale and, particularly, to an electronic digital scale with a memory which stores measured data for calculations of measured data with the subsequent data.

A scale with arithmetic operation capabilities is well known. However, such a scale is not provided with a memory. When measuring a certain length which exceeds the limited length of an extensible tape member included within the measurement instrument, an operator would forget previous data obtained by measurement procedures for calculations requiring the measured data and the subsequent data. Therefore, such measurements were troublesome and were not necessarily accurate.

OBJECTS AND SUMMARY OF THE INVENTION

Accordingly, an object of the present invention is to provide an improved electronic digital scale with a memory which can obtain a total of length data of a substantially long object by addition or subtraction of repeatedly measured data through the use of the memory.

Another object of the present invention is to provide an improved electronic digital scale with a memory which stores measured data for calculating the measured data with subsequent data determined by the subsequent measurement procedures.

To achieve the above objectives, pursuant to an embodiment of the present invention, a memory key means is provided for transmitting a first piece of measurment data determined by a first measurement procedure into a memory means included within an electronic digital scale. The memory within the digital scale aids in subsequently measuring the length of an object and in providing a total of measurement information. The memory means stores a first piece of measurement data determined by the first measurement procedures upon depression of a memory key. Calculation key means is provided for calculating the first measurement data with the subsequent measurement information for calculation purposes.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
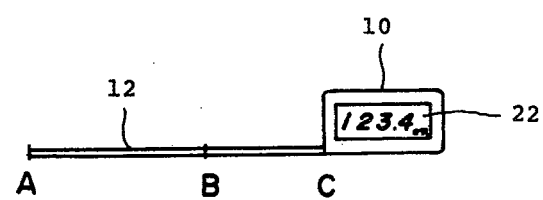
FIG. 1 is a front view of an electronic digital scale with a memory of an embodiment of the present invention.
Figure 2:
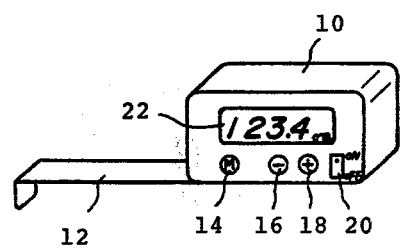
FIG. 2 is a perspective view of the electronic digital scale with a memory shown in FIG. 1.

FIG. 1 shows an electronic digital scale with a memory of the present invention, when being used, wherein a key means formed on an external surface of the electronic digital scale is omitted for convenience sake. FIG. 2 shows in a perspective view the electronic digital scale with the memory shown in FIG. 1.

An electronic digital scale with the memory 10 of the present invention mainly comprises an extensible tape member 12, a memory key 14, a minus key 16, a plus key 18, a power switch 20, and a digital display 22.

The tape member 12 is adapted to extend along an object when measuring. The memory key 14 in the depressed state functions to transmit a first piece of data into a memory, when the subsequent measurement procedures are ready. The minus key 16 is used to substract a second piece of measurement data from the first piece of measurement data for obtaining final results. The plus key 18 is used to sum up the measurement data for obtaining final measurement results. The power switch 20 controls power supply to the electronic digital scale 10. The digital display 22 provides a digital indication of the measurement results each time the measurement procedure is carried out.

Figure 3:
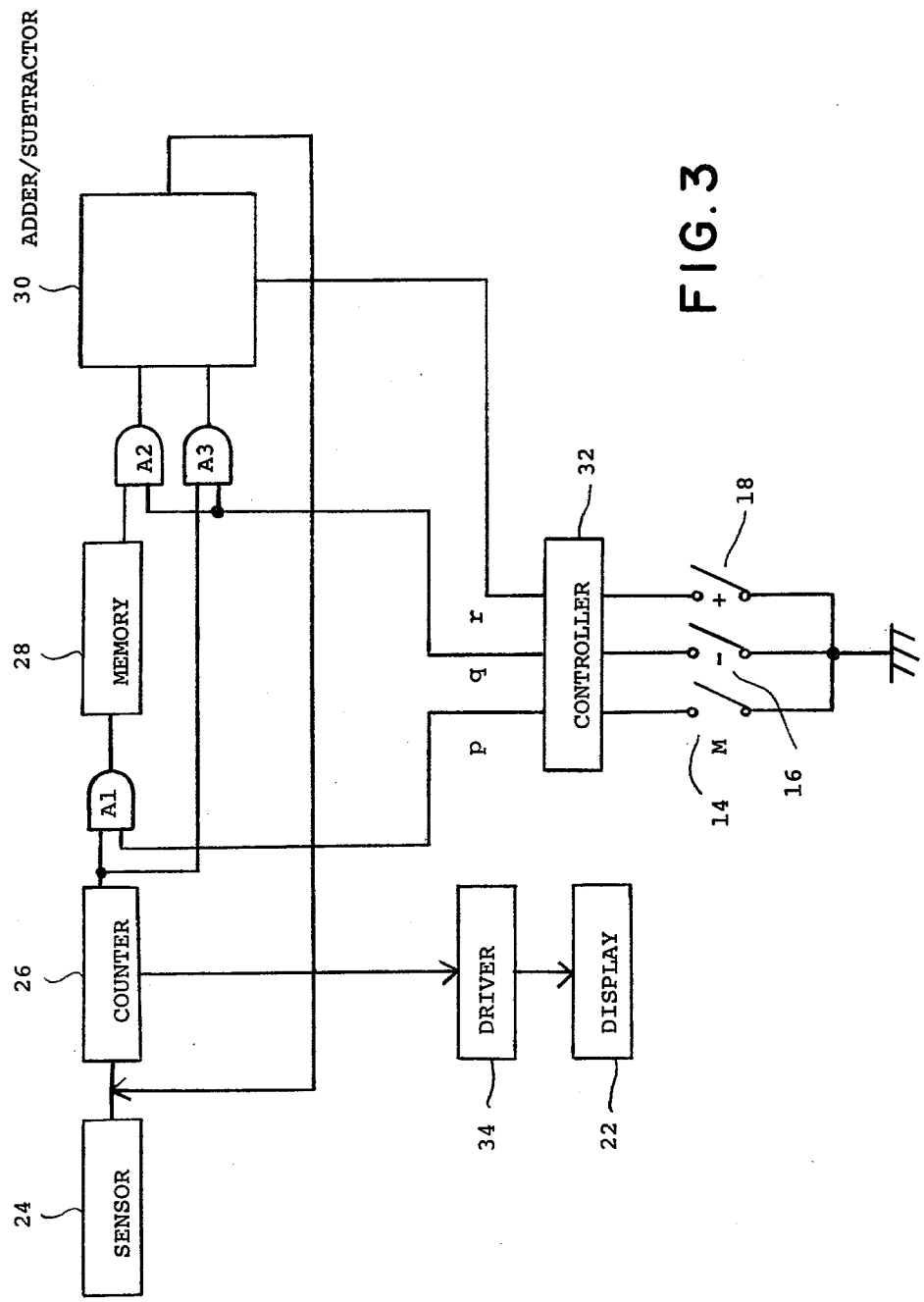
FIG. 3 is a block diagram of an electronic circuit accommodated within the electronic digital scale with the memory shown in FIG. 1.

Attention is directed to FIG. 3, wherein a calculating scheme of the electronic digital scale 10 is disclosed in a block diagram.

The calculating scheme of the electronic digital scale 10 mainly comprises a sensor 24, a counter 26, the above-described memory 28, an adder/subtractor 30, a controller 32, a driver 34, and the digital display 22.

The sensor 24 functions to convert a travelled distance of the extensible tape member 12 into a digital signal which in turn is introduced into the counter 26. The counter 26 determines counts of the digital signal for measuring of the tape 12. The memory 28 stores the digital count for finally determining the measurement results through a subtraction or addition of the measurement data in response to the controller 32. The adder/substractor 30 /manipulates to obtain the measurement results in accordance with the counts contained within the counter 26 and the contents of the memory 28 in response to the controller 32. The adder/subtractor 30 effects addition operation of input information therein without receiving special control signals from the controller 32 and subtraction operation of input information therein with receiving special control signals from the controller 32.

The controller 32 develops control signals p, q and r through the use of a micro-order system implemented therein in accordance with the actuation of the memory key 14, the minus key 16, and the plus key 18. The control signal p is generated in response to the actuation of the memory key 14. The control signal q is emerged through the use of the plus key 18 and the control signals q and r are developed through the actuation of the minus key 16. The control signal p conducts an AND gate A1 which transmits the information stored in the counter 26 into the memory 28. The control signal q conducts an AND gate A2 which proceeds the information stored in the memory 28 into the adder/subtractor 30 and, simultaneously, conducts an AND gate A3 which transfers the information contained within the counter 26 to the adder/subtractor 30.

The measurement results obtained through the use of the adder/subtractor 30 are introduced into the counter 26 and then to the driver 34 which excites the digital display 22.

In operation, a way to measure the distance between the points A and B is to substract the distance between the points B and C from the distance between the points A and C. The operator first measures the distance between the points A and C through the use of the extensible tape member 12. Distance information between the points A and C is detected by the sensor 24 and determined by the counter 26. The distance information is introduced into the memory 28 through the conductiveness of the AND gate A1 by the memory control signal p in response to the actuation of the memory key 14. Further distance information between the points B and C is detected by the sensor 24 and determined by the counter 26 in the same manner.

Under these circumstances, the minus key 16 is actuated to instruct the adder/subtractor 30 to subtract the distance between the points B and C from that between the points A and C, whereby the distance between the points A and B is now available. The control signal q derived from the controller 32 in response to the actuation of the minus key 16 makes the AND gates A2 and A3 conductive to transmit the respective distance information loaded into the memory 28 and stored in the counter 26 into the adder/subtractor 30. The control signal r is introduced into the adder/subtractor 30 in response to the actuation of the minus key 16. The adder/subtractor 30 subtracts the further distance information between the points B and C from the distance information between the points A and C in accordance with the control signal r. The thus derived distance information between the points A and B is supplied to the driver 34 through the counter 26 for displaying the results on the digital display 22.

When measuring an object having a certain length beyond the limited length of the extensible tape member 12, the length of the object should be measured through the additions of the respective measurement date using the memory key 14 and the plus key 18. For example, three (3) measurement procedures are effected to obtain a total of the distance of the object as follows.

First measurement information is introduced into the memory 28 through the use of the memory key 14 immediately after the operator terminates to extend the digital scale. Second measurement information is obtained in the same manner and then stored in the counter 26. The actuation of the plus key 18 generates the control signal q through the controller 32, the control signal q enabling the AND gated A2 and A3 to transfer the first and the second measurement information to the adder/subtractor 30. The adder/subtractor second measurement 30, sums the second measurement information to the first measurement information, under the condition that no control signal r is introduced therein. Thus the summed information is introduced into the counter 26 and visually indicated on the display 22 through the driver 34.

Upon the actuation of the memory key 14, the above-mentioned information is introduced into the memory 28 and the counter 26 is responsive to third measurement information data. Further actuation of the plus key 18 helps the adder/subtractor 30 to add the third measurement information stored in the counter 26 to the above-mentioned information stored in the memory 28 through the use of the controller 32.

The actuation of the plus key 18 generates the control signal q effective to introduce into the adder/subtractor 30 both the third measurement information stored in the counter 26 and the summed information memorized in the memory 28. The adder/subtractor 30 adds the third measurement information to the summed information to obtain the measurement results which is then introduced into the counter 26 and then the display 22 through the driver 34 as described above. It will be noted from the above description that the minus key 16 and the plus key 18 can be both used also when obtaining a single measurement result. In this instance, when the control signal r is introduced therein, in response to the actuation of the minus key, the measurement information stored in the counter 26 is subtracted from the previously added measurement information stored in the memory 28.

Figure 4:
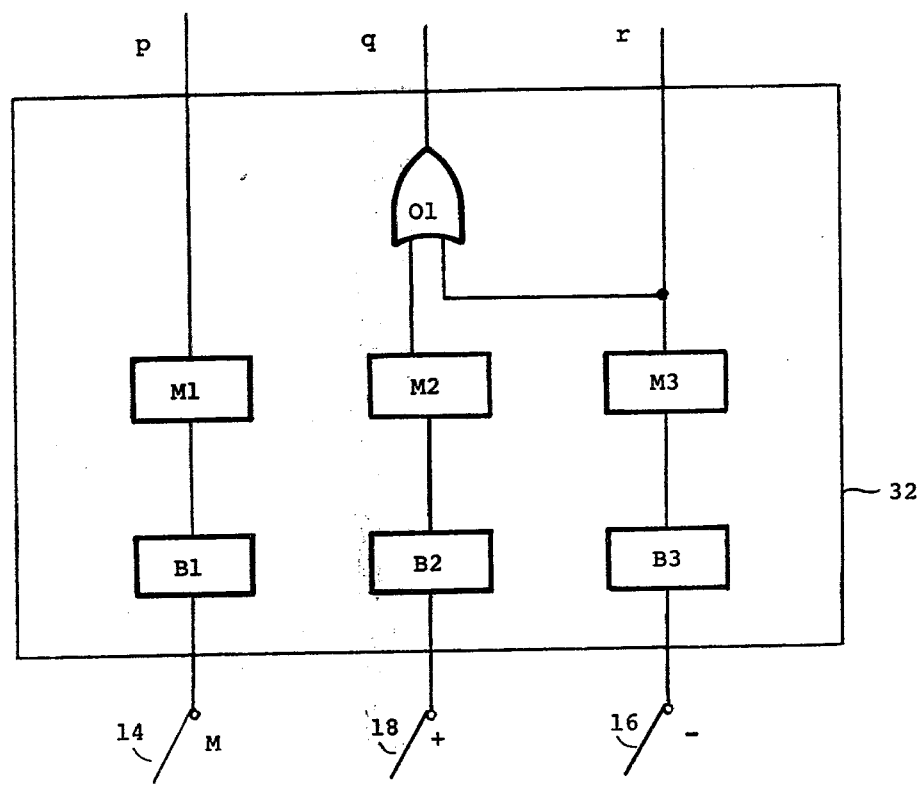
FIG. 4 is a block diagram of a controller included within the electronic circuit sown in FIG. 3.

FIG. 4 shows circuit configuration of the controller 32 which comprises three one-shot mono-multivibrator M1, M2 and M3, three differentiators B1, B2 and B3, and an OR gate O1. The differentiators B1, B2 and B3 function to provide trigger pulses for the one-shot mono-multivibrators M1, M2 and M3, respectively. The one-shot mono-multivibrators M1, M2 and M3 provide the control signals p,. q and r in accordance with the actuation of the memory key 14, the plus key 18, and the minus key 16, respectively.

In response to the actuation of the memory key 14, the control signal p is generated from the mono-multivibrator M1 which is excited y the differentiator B1.

The control signal r is provided by the mono-multivibrator M3 with the differentiator B3 in response to the actuation of the minus key 16. The control signal q is developed through the OR gate O1 which receives the control signal r and the output signal from the mono-multivibrator M2 in accordance with the plus key 18. The control signals p, q and r have time periods long enough to control the AND gates A1, A2, A3 and the adder/subtractor 30, respectively.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A small portable electronic digital scale comprising:
   an extensible means for extending along an object to be measured;
   sensing means for sensing first and second measurement information data representative, respectively, of first and second extended positions of said extensible means;
   storing means for storing said first measurement information data;
   operating means interconnected with said sensing means and said storing means for arithmetically operating on said first measurement information based upon said second measurement information yielding a result;
   said operating means further comprising:
   a memory;
   an adder;
   means responsive to the sensed and stored information for interconnecting said memory and said adder;
   indicating means for directing said operating means to perform a calculation on said first and second measurement information thereby providing third measurement information as said results of said calculation in response to actuation of said indicating means;

said interconnecting means further comprising:

first means included within said operating means to gate said first measurement information data from said sensing means into said memory;

second means included within said operating means to gate said first mesurement information from said memory into said adder;

third means included within said operating means to gate said second measurement information data from said sensing means into said adder; and means for displaying said third measurement information.

2. The electronic digital scale set forth in claim 1, which further comprises a sensor means for detecting a said travelled distances of said extensible member and providing travelling signals corresponding to said travelled distances; and a counter means for counting said travelling signals.

3. The electronic digital scale set forth in claim 1, wherein said operating means functions to add said second measurement information to said first measurement information.

4. The electronic digital scale set forth in claim 1, wherein said operating means functions to subtract said first measurement information from said second measurement information.

5. The electronic digital scale set forth in claim 1, wherein said operating means functions to add said second measurement information to said first measurement information upon the acuation of a plus key.

6. The electronic digital scale set forth in claim 1, wherein said operating means functions to substract said second measurement information from said first measurement information upon the actuation of a minus key.

7. An electronic digital scale in accordance with claim 1, wherein said sensing means comprises:

a sensor means for detecting said measurement information from said extensible member and providing an output signal; and counter means responsive to said output signal for converting said output signal into a storable output.

8. An electronic digital scale, in accordance with claim 7, wherein said operating means further comprises an arithmetic function selection and controlling means including a memory key;

a minus key;

a plus key; and a controller means responsive to said memory, minus, and plus keys for generating operation selection signals for said interconnecting means.

9. An electronic digital scale, in accordance with claim 8, wherein said interconnecting means comprises:

a first AND gate responsive to said controller means to gate said first measurement information data from said counter means into said memory;

a second AND gate responsive to said controller means to gate said stored data from said memory into said adder; and a third AND gate responsive to said controller means to gate said second measurement information data from said counter means to said adder.

10. An electronic digital scale, in accordance with claim 9, wherein said controller means comprises:

a first flip-flop/differentiator series combination, connected to said memory key on one end and to an input of said first AND gate on the other;

an OR gate;

a second flip-flop/differentiator series combination, connected to said plus key on one end and to an input of said OR gate on the other end, said OR gate having an output driving said second and third AND gates; and a third flip-flop/differentiator series combination, connected to said minus key on one end and simultaneously to an input of said OR gate and to the adder on the other end.

11. An electronic digital scale, in accordance with claim 10, wherein said interconnecting means comprises:

a first AND gate responsive to said controller means to gate said first measurement information data from said counter means into said memory;

a second AND gate responsive to said controller means to gate said stored data from said memory into said adder; and a third AND gate responsive to said controller means to gate said second measurement information data from said counter means to said adder.

12. An electronic digital scale, in accordance with claim 11, wherein said means for displaying said third measurement information comprises:

a feedback loop extending from said adder to the input of said counter means, said counter means having an output driving said display means.

* * * * *